United States Patent [19]

Takemura

[11] Patent Number: 5,757,444
[45] Date of Patent: May 26, 1998

[54] ELECTRO-OPTICAL DEVICE AND METHOD OF DRIVING THE SAME

[75] Inventor: Yasuhiko Takemura, Kanagawa, Japan

[73] Assignee: Semiconductor Energy Laboratory Co., Ltd., Kanagawa, Japan

[21] Appl. No.: 886,569

[22] Filed: Jul. 1, 1997

Related U.S. Application Data

[60] Continuation of Ser. No. 460,687, Jun. 2, 1995, abandoned, which is a division of Ser. No. 51,313, Apr. 23, 1993.

[30] Foreign Application Priority Data

Apr. 28, 1992 [JP] Japan ............... 4-135865

[51] Int. Cl.[6] ................. G02F 1/136; G02F 1/1343
[52] U.S. Cl. .................. 349/38; 349/43; 349/143
[58] Field of Search ................. 359/55, 59, 79, 359/87; 349/38, 39, 42, 48, 109, 143, 144, 145; 257/59, 72; 345/92

[56] References Cited

U.S. PATENT DOCUMENTS

| | | | |
|---|---|---|---|
| 4,431,271 | 2/1984 | Okubo | 359/59 |
| 4,582,395 | 4/1986 | Morozumi | 359/59 |
| 4,621,260 | 11/1986 | Suzuki et al. | 359/59 |
| 4,773,737 | 9/1988 | Yokono et al. | 359/59 |
| 4,778,773 | 10/1988 | Sukegawa . | |
| 4,955,697 | 9/1990 | Tsukada et al. | 359/57 |
| 5,028,122 | 7/1991 | Hamada et al. | 359/59 |
| 5,042,918 | 8/1991 | Suzuki . | |
| 5,056,895 | 10/1991 | Kahn . | |
| 5,058,995 | 10/1991 | Plus | 359/59 |
| 5,159,476 | 10/1992 | Hayashi | 359/59 |
| 5,185,601 | 2/1993 | Takeda et al. | 349/39 |
| 5,191,451 | 3/1993 | Katayama et al. | 349/39 |
| 5,193,017 | 3/1993 | Iwai et al. | 349/43 |
| 5,289,174 | 2/1994 | Suzuki | 345/98 |
| 5,327,001 | 7/1994 | Wakai et al. | 349/44 |
| 5,339,181 | 8/1994 | Kim et al. | 349/38 |
| 5,446,562 | 8/1995 | Sato | 359/59 |
| 5,453,857 | 9/1995 | Takahara | 359/59 |
| 5,459,596 | 10/1995 | Ueda et al. | 359/59 |
| 5,463,230 | 10/1995 | Negoto et al. | 359/59 |
| 5,463,483 | 10/1995 | Yamazaki | 359/59 |
| 5,576,857 | 11/1996 | Takemura | 349/42 |

FOREIGN PATENT DOCUMENTS 60-54478 3/1985 Japan .
1156725 6/1989 Japan .

OTHER PUBLICATIONS

Brody et al. "A 6x6 Inch 20 Lines–per–Inch Liquid Crystal Display Panel"IEEE Transactions on Electrons Devices—vol. ED–20–Nov. 1973, pp. 995–1001 No month.

Primary Examiner—William L. Sikes
Assistant Examiner—Tai V. Duong
Attorney, Agent, or Firm—Sixbey Friedman Leedom & Ferguson, P.C.; Gerald J. Ferguson, Jr.; Eric J. Robinson

[57] ABSTRACT

An active matrix display device for suppressing voltage variation $\Delta V$ due to off-operation of a gate pulse, including TFTs and picture-element electrodes, at least one of the TFTs being assigned to each picture element, and each of the TFTs having a gate electrode connected to a gate line (first gate line), and a source and a drain one of which is connected to a data line, wherein a picture-element electrode concerned is formed so as to be overlapped with the first gate line through an insulator, and also so as to be overlapped through an insulator with a gate line other than the first gate line or a wiring disposed in parallel to the first gate line.

6 Claims, 5 Drawing Sheets

ELECTRO-OPTICAL DEVICE AND METHOD OF DRIVING THE SAME

This application is a Continuation of Ser. No. 08/460,687, filed Jun. 2, 1995, now abandoned; which itself is a divisional of Ser. No. 08/051,313 filed Apr. 23, 1993.

BACKGROUND OF THE INVENTION

1. Field of the Invention

This invention relates to an electro-optical device such as a liquid crystal display device, and particularly to a display device having an active matrix circuit.

2. Description of Prior Art

Recently, an active matrix circuit for driving a liquid crystal display has been actively studied and put into practical use. As an active element has been proposed one having a construction that a conductive-type thin film transistor (TFT) is used for a picture element. Such an active matrix circuit has capacitors each comprising a picture-element electrode, a counter electrode and liquid crystal interposed between these electrodes, and charges to be supplied to and discharged from the capacitor are controlled by a TFT. In order to perform a stable image display, a voltage across both electrodes of each capacitor is required to be kept constant, however, it has been difficult to satisfy this requirement for some reasons.

The most significant reason is that charges leak from the capacitor even when the TFT is in an off-state. There is another leakage of charges inside of the capacitor, however, the former leakage of the charges from the TFT is larger than the latter leakage by about one order. When this leakage occurs intensively, there occurs a phenomenon, so-called flicker that light and darkness of an image is varied at the same frequency as a frame frequency. As another reason, a gate signal is capacitively coupled to a picture-element potential due to parasitic capacitance between a gate electrode of the TFT and the picture-element electrode to induce variation of a voltage ($\Delta V$).

In order to solve these problems, an auxiliary (or additive) capacitance has been disposed in parallel to the picture-element capacitance. Provision of such an auxiliary capacitance causes a time constant of discharging of charges from the picture-element capacitance to be increased. In addition, representing a gate pulse (signal voltage) by $V_G$, the picture-element capacitance by $C_{LC}$, the auxiliary capacitance by C, and the parasitic capacitance between the gate electrode and the picture-element electrode by C', $\Delta V$ is represented as follows;

$$\Delta V = C'V_G/(C_{LC}+C'+C)$$

and $\Delta V$ can be reduced if C is larger than C' and $C_{LC}$.

Conventionally, a circuit construction as shown in FIG. 2(A) or 2(B) has been adopted for the auxiliary capacitance. These circuit arrangements are shown by circuit diagrams of FIGS. 2(C) and 2(D), respectively. In the circuit arrangement as shown in FIG. 2(B), a ground line, for example $X_n$, is formed in parallel to a gate line $X_n$ (or data line $Y_m$), and a picture-element electrode is formed so as to be overlapped with the ground line, thereby forming a capacitance C. In FIG. 2(B), the auxiliary capacitance C is represented by an oblique-line portion, and $C_{LC}$ represents a picture-element electrode. However, in this circuit arrangement (method), a wiring is required to be newly formed, and thus there is a disadvantage that the aperture ratio is reduced and a screen is darkened.

On the other hand, in the circuit arrangement as shown in FIG. 2(A), a picture-element electrode which is connected to the gate line $X_n$ is partially overlapped with a next gate line $X_{n+1}$ to form an auxiliary capacitance C (as indicated by an oblique-line portion) at the overlap portion. In this case, no wiring is required to be newly formed, and thus the aperture ratio is not reduced. However, it has been known that a gate pulse is affected by capacitance which is added to the gate line.

At any rate, in these methods (circuit arrangements), substantially no solution have been made particularly to $\Delta V$. These methods provide some degree of effect in a point that the time constant of the discharging of the picture element is lengthened, however, no solution has been made to the point that $\Delta V$ occurs asymmetrically. FIG. 3(C) shows a driving operation of a conventional TFT active matrix circuit. In this case, the potential of a counter electrode of a picture-element electrode is set to "0" V, and the potential of the gate line at non-selection time is also set to "0" V. However, as usually adopted, the potential of the counter electrode may be added with a proper offset potential while the potential of the data line is also added with the same offset potential. Actually, the same result as shown in FIG. 3 is obtained. Particularly when the potential of the gate line and the potential of the counter electrode are set to zero as shown in FIG. 3, the signal of the data line is required not to exceed a threshold voltage of the TFT, and no stable matrix driving can be performed unless this condition is satisfied.

As is apparent from FIG. 3, $\Delta V$ is shifted with respect to the data signal in such a direction that the potential thereof is decreased. For example, even when an auxiliary capacitance is added to reduce $\Delta V$, the response is still asymmetrical. In this point, the provision of the auxiliary capacitance is a negative countermeasure.

SUMMARY OF THE INVENTION

An object of this invention is to provide a display device and a display method for positively reducing $\Delta V$ with a technical idea different from the conventional technical idea, and more particularly to provide an effective arrangement of display picture elements and a circuit arrangement for the display device and the display method.

$\Delta V$ is originally caused by application of a pulse to only the gate electrode. If, in addition to a first TFT, the same type of second TFT having the same amount of parasitic capacitance as the first TFT is added in a picture element and a pulse having a different polarity from and the same height as a gate pulse is applied to the second TFT simultaneously with the application of the gate pulse, the contribution of the gate pulse to a picture-element electrode could be offset (counteracted). The inventor of this application has found this technical idea, and further developed the theory of this technical idea. As a result, he has finally found that the same effect can be obtained if any circuit having an equivalently same capacitance may be provided in place of the second TFT which is additively provided.

That is, representing a parasitic capacitance between a gate electrode and a picture-element electrode by $C_1$ and a parasitic capacitance between a second wiring different from the gate electrode and the picture-element electrode by $C_2$, and representing the height of a pulse of the gate electrode $V_1$, and the pulse height of the second wiring by $V_2$, $\Delta V$ is represented as follows:

$$V = -(C_1V_1 + C_2V_2)/(C_1+C_2)$$

If $V_2=0$, the data signal would be lowered by $\Delta V$ like the prior art. However, if $V_2=-C_1V_1/C_2$, $\Delta V$ would be equal to zero. For example, for $C_1=C_2$, $\Delta V$ is mutually counteracted (offset) and equal to zero by setting $V_2$ to be equal to $V_1$. As described above, in comparison with the conventional method of relatively reducing $\Delta V$ by providing the auxiliary capacitance, the method of this invention is a more positive method in the meaning that a voltage increase (variation) capable of counteracting $\Delta V$ is generated and $\Delta V$ is offset by this voltage increase (variation).

According to further consideration of the inventor, the following matter has been also found. If, irrespective of the complete synchronization between the gate pulse and the pulse of the second wiring, the device is so designed that the pulse of the second wiring is intermitted (dropped or cut) after the gate pulse is intermitted (dropped or cut), the same effect as obtained when the gate pulse and the second-wiring pulse are completely synchronized with each other would be obtained although the potential of the picture-element electrode is temporally varied. The pulse starting time for the gate pulse may be earlier or later than that of the second-wiring pulse because $\Delta V$ occurs at the off-time of the gate pulse.

As the second wiring may be used a wiring which is completely independently provided, however, may be used another gate line. Through further consideration, it has been found in this invention that even when a gate line for driving a picture element concerned is overlapped with the picture-element electrode, no problem would occur if the same capacitance as the capacitance at the overlap portion can be obtained by the second wiring. Rather, the capacitance formed at this time is more effective in the meaning that it acts as an auxiliary capacitance to increase the time constant of the picture element.

This means that a slight amount of parasitic capacitance of a TFT has no obstruction insofar as it is considered as a design factor. In the conventional method (FIG. 2), such a design that a picture-element electrode is overlapped with a gate line for driving the picture element has been inhibited because this design remarkably increases parasitic capacitance. In this point, this invention makes an epoch by breaking such a conventional custom. As described later, the above design of this invention is ideal in improving aperture ratio. This is because in the prior art attention has been mainly paid to the parasitic capacitance between the gate electrode/wiring and the picture-element electrode, and thus the picture-element electrode is formed away from the TFT and the gate wiring as far as possible, so that a large area is not effectively used. Particularly when an area to be assigned to one picture element is reduced, the aperture ratio tends to be reduced.

In a case where the gate pulse and the pulse of the second wiring are designed so as to have the same pulse height (polarity is opposite to each other), a permissible range for $C_1$ and $C_2$ is calculated. Considering a case where the picture-element electrode is very small, the capacitance of the picture element itself is very small. On the other hand, it is technically difficult to reduce the size of the TFT, and thus the parasitic capacitance would be invariable. Even if the auxiliary capacitance is provided as a countermeasure like the prior art, the ratio of the auxiliary capacitance to the parasitic capacitance is about 10:1. If this invention is applied to obtain the same effect, the sum of $C_1$ and $C_2$ (parasitic capacitance of TFT is contained in $C_1$ or $C_2$) is required to be set to a value above ten times as large as the difference between $C_1$ and $C_2$, and this requirement can be relatively easily achieved.

The above case corresponds to a case where the ratio of $C_1:C_2$ is approached to 1:1. There is another simple method of approaching the ratio of $C_1:C_2$ to another ratio. In this case, the minimum value of $\Delta V$ can be obtained by controlling the ratio of $V_1$ and $V_2$. For example, for $C_1:C_2=1:2$, $V_1:V_2$ may be set to 2:-1.

For example, even when the circuit construction is identical to that of the prior art as shown in FIG. 2, the voltage satisfying the condition of this invention may be applied to a gate line ($X_{n+1}$) and a ground line ($X_{n'}$) which do not participate in the driving of the picture element concerned. The parasitic capacitance is greatly large for the TFT, etc. to which a self-alignment system is not applicable, however the dispersion thereof can be controlled with high accuracy. For example, it is controlled to be within 10%. This value of the parasitic capacitance is represented by $C_1$, and an auxiliary capacitance $C_2$ having five times as large as the capacity of $C_1$ can be formed with high controllability by a geometrical method. In this case, if an insulating film of a capacitor is designed in the same thickness, the auxiliary capacitance can be formed with accuracy within 1%. In the conventional method, $\Delta V=(0.17\pm0.017)V_1$. However, if this invention is applied and $V_2$ is set to be equal to $-0.2V_1$, $\Delta V=\pm0.017V_1$. That is, the dispersion of $\Delta V$ is invariable irrespective of the application of this invention, however, the magnitude of $\Delta V$ is reduced to one-tenth (zero in average).

In the above description, the signal to be applied to the second wiring is required to have the opposite polarity (opposite phase) to the gate pulse. This does not means only that if the gate pulse is positive, the second signal is negative. That is, the pulse height of an optimum signal to be applied to the second wiring is the sum of the potential of the second wiring at the non-selection time and the potential of $-C_1V_1/C_2$. That is, the opposite polarity of this invention means that the potential of the signal to be applied to the second wiring is shifted (varied) in the opposite direction to the shift (variation) direction of the potential of the gate pulse. Accordingly, for example, when the potentials of the gate at the non-selection time and the second wiring are set to 0V and 10V and the potential of the gate line at a selection time is set to 8V, the potential of the second wiring is required to be below 10V, however, it is not necessarily required to be negative.

The circuit construction with which this invention is implemented is shown in FIGS. 1(A) and 1(B). Here, each of $C_1$ and $C_2$ represents capacitance which is obtained through overlapping (superposition) of the wiring and the pixel electrode (picture-element electrode). A gate line, a data line, the pixel electrode and another gate line or an exclusive wiring are provided on a substrate. In both circuit constructions as shown in FIGS. 1(A) and 1(B), a pixel electrode (picture-element electrode) is overlapped with (superposed on) a gate line for driving the picture element with an insulator therebetween, and this arrangement is the main feature of this invention.

As shown in FIGS. 1(A) and 1(B), at least one transistor is provided on the substrate and connected with the gate line at a gate thereof and connected with the data line at one of source and drain thereof and connected with the pixel electrode at the other one of the source and drain. Difference between area shared by the gate line and the pixel electrode connected thereto through a transistor and area shared by the another gate line or the exclusive wiring and the pixel electrode is not more than one tenth of the sum thereof.

In the circuit construction as shown in FIG. 1(A), exclusive wirings $X_{n'}$ and $X_{n+1'}$ are provided independently of the gate lines $X_n$ and $X_{n+1}$. The pixel electrodes are superposed on the exclusive wirings $X_{n'}$ and $X_{n+1'}$, respectively with an insulator therebetween. In a case where pulses having same height and opposite polarities are applied to $X_n$ and $X_{n'}$ respectively. $C_1$ and $C_2$ are required to be formed so as to be equal to each other to the utmost. The exclusive wirings $X_{n'}$ and $X_{n+1'}$ are in parallel with the gate lines $X_n$ and $X_{n+1}$.

FIG. 1(C) is an equivalent circuit diagram of the circuit construction as shown in FIG. 1(A).

The gate line ($X_n$) is in parallel with the gate line ($X_{n+1}$) in FIG. 1(B). In FIG. 1(B), a pixel electrode (picture-element electrode) is overlapped with (superposed on) both of the gate line ($X_n$) for driving the picture element concerned and the gate line ($X_{n+1}$) on a next line to form the capacitances $C_1$ and $C_2$ at the overlap portions, respectively. Of course, in this case, when pulses having the same height and different polarities are substantially simultaneously applied to $X_n$ and $X_{n+1}$, $C_1$ and $C_2$ is also required to be formed so as to be equal to each other to the utmost. In this case, in order to effectively use an area, an alternate arrangement may be adopted. Such an alternate arrangement is favorable for a color-arrangement for picture elements.

That is, conventionally, the picture elements has been arranged in a honeycomb shape or hexagonal shape to improve a color mixing. In this case, wirings are bent in accordance with the arrangement shape of the picture elements. This causes increase of wiring resistance, and also causes increase of fraction defective due to difficulty in manufacturing. However, in this invention, an ideal hexagonal structure can be obtained without bending the wirings.

An equivalent circuit of FIG. 1(B) is shown in FIG. 1(D). In this case, as shown in FIG. 1(D), the gate line is required to be supplied with a bipolar pulse comprising a combination of a positive pulse and a negative pulse. This is because when one gate line is selected, another gate line is required to be supplied with a voltage having opposite polarity. In a picture element $Z_{n,m}$, $C_2$ is supplied with a pulse for driving a picture element $Z_{n+1,m}$, and thus the voltage of the picture element is temporally affected. A method of driving an electro-optical device comprising:

a first gate line provided on a substrate;

a data line provided on said substrate;

a second gate line provided on said substrate;

a pixel electrode provided on said substrate and superposed on said second gate line with an insulator therebetween; and at least one transistor provided on said substrate and connected with said first gate line at a gate thereof and connected with said data line at one of source and drain thereof and connected with said pixel electrode at the other one of the source and drain, said method comprises:

applying a bipolar pulse comprising two pulses having opposite polarities to each other to said first gate line. The pixel electrode is superposed on the first gate line with an insulator therebetween.

The operations of these circuits are shown in FIGS. 3(A) and 3(B). FIG. 3(A) shows a driving operation for the circuit as shown in FIGS. 1(A) and 1(C), and FIG. 3(B) shows a driving operation for the circuit as shown in FIGS. 1(B) and 1(D). In a case where there is a time lag between a pulse which is applied for the purpose of driving the picture element (TFT) concerned and a pulse which is applied for the purpose of canceling (offsetting) $\Delta V$, the voltage is temporally varied, but returned to its original state. Therefore, affection of such variation of the voltage on an image is very slight, and thus it is visually unidentifiable.

Such a circuit can be formed using directly a conventional TFT producing technique. In addition, as a preferable matter, no attention is required to be paid to the parasitic capacity between the gate line and the picture-element electrode unlike the prior art, and thus a number of processes can be reduced with a back-surface exposure technique using metal wirings as a mask. FIG. 4 shows an example of the circuit thus formed. An electro-optical device of an active matrix thus formed comprises:

a first gate line provided on a substrate;

a first data line provided on said substrate;

a second gate line provided on said substrate and adjacent to said first gate line;

a second data line provided on said substrate and adjacent to said first data line; and a pixel electrode provided on said substrate and connected with said first gate line and said first data line through at least one transistor, a gate thereof being connected with said first gate line and one of source and drain thereof being connected with said first data line and the other one of the source and drain being connected with said pixel electrode, wherein said pixel electrode has substantially the same shape of an area surrounded by said first data line and said second data line and said first gate line and said second gate line, and said pixel electrode is enclosed by said first data line and said second data line and said first gate line and said second gate line. Capacitors are formed since the pixel electrode is superposed on the first data line and the second data line and the first gate line and the second gate line with insulators between the pixel electrode and each of the first data line and the second data line and the first gate line and the second gate line. In FIG. 4, picture-element electrodes 412 are just partitioned by metal wirings, that is, gate lines 402 and data lines 408. However, the picture-element electrodes and the metal wirings are geometrically overlapped with each other due to diffraction of light in an exposure process. At this time, it is apparent from the above description of the subject matter of this invention that no problem arises in overlap between the picture-element electrodes and the gate lines.

No problem arises in the overlap between the data lines and the picture-element electrodes. Of course, signals of the data lines flow into the picture element concerned, and they act as noises, so that a phenomenon such as a so-called cross-talk may occur. However, the degree of this phenomenon can be sufficiently suppressed. For example, the interval of the gate lines may be narrowed so that the capacitance induced by the overlap between the data line and the pixel electrode (picture-element electrode) is reduced to a value smaller than the auxiliary capacitances $C_1$ and $C_2$ (the capacitances of the capacitors formed by the pixel electrode and the gate lines).

Further, the cross-talk phenomenon can be more suppressed by alternating the data lines every other line. This corresponds to a case where when a positive signal is applied to a data line $Y_m$ with respect to the counter electrode opposed to the data line $Y_m$, a negative signal is applied to a data line $Y_{m+1}$ with respect to the counter electrode opposed to the data line $Y_{m+1}$. That is, the polarity of the signal is set to be opposite between the data lines $Y_m$ and $Y_{m+1}$. Of course, video signals to be applied to the respective data lines are independent of one another, however, it is regarded that the substantially same video signals are input to these data lines in a general image display because the video signals of the neighboring picture elements are similar to one another. Therefore, the signals to be applied to the data lines $Y_m$ and $Y_{m+1}$ have the same pulse height and opposite polarity, and thus affection of these data lines on the picture-element electrode is mutually offset. As a result, there occurs no cross-talk which would be induced by the coupling between the data line and the picture-element electrode.

FIG. 5 shows an embodiment of a method of forming the TFT and the picture element as described above. In this embodiment, a reverse stagger type which is used for amorphous silicon TFT is formed. However, the same back-surface exposure technique can be used for a planar type.

First, a gate line 402 is formed on a substrate 401, and an oxide 403 is formed on the surface of the gate line 402 by an anode-oxidation method if occasion demands. Thereafter, a gate insulating film 404 is formed, a semiconductor channel region 405, a drain region 406 and a source region 404 are formed, and then a data line 408 is formed (see FIG. 5(A)). Subsequently, an insulating flatting film 409 of polyimide or the like is formed, and an electrode hole is formed in the insulating flatting film. Thereafter, a transparent conductive film 410 is formed at the front surface, and a photoresist is coated on the front surface (see FIG. 5(B)). The same method as the conventional TFT producing method is used for these processes.

Next, light is irradiated from the back side of the substrate to expose the resist to light. In this case, the wavelength of the light and thickness of the semiconductor regions 406 and 407 are preferably so controlled that the light can pass through the semiconductor regions. Consequently, the resist at the metal wiring portion is removed, and only the resist 411 at the other portion remains. Of course, a part of the resist remains even on the metal wirings due to diffraction of the light. These processes are shown in FIG. 5(C).

Finally, the transparent conductive film is etched using the residual resist as a mask to form a pixel electrode (picture-element electrode) 412 superposed on the gate line 402 with the anodic oxide therebetween. The anodic oxide comprises an oxide of a material of the gate line 402 such as aluminum, tantalum and titanium. In the above process, a mask positioning operation which has been conventionally required in the etching process of the transparent conductive film is not required in this embodiment. Particularly in a case where the mask positioning is carried out and the transparent conductive film is etched, it has been difficult to strictly control the values of $C_1$ and $C_2$ due to deviation of the mask. In this method, the values of $C_1$ and $C_2$ are substantially equal to each other, and thus this is favorable for the subject matter of this invention. In addition, the overlap between the picture-element electrode and the data line is also symmetrical between right and left sides, and by properly performing the alternation of the data line as described above, the cross-talk can be completely removed.

As shown in FIGS. 1(B), 6(A) and 6(B), an electro-optical device of an active matrix in accordance with the present invention comprises:

a gate line of n-th row provided on a substrate;

a gate line of (n+1)-th row provided on said substrate;

a data line of m-th column provided on said substrate;

a pixel electrode of n-th row and m-th column provided on said substrate and connected with said data line and said gate line of n-th row through corresponding at least one transistor; and a pixel electrode of (n+1)-th row and m-th column provided on said substrate and connected with said data line and said gate line of (n+1)-th row through corresponding at least one transistor, wherein said pixel electrode of n-th row and m-th column is provided on an opposite side of said data line to said pixel electrode of (n+1)-th row and m-th column.

BRIEF DESCRIPTION OF THE DRAWINGS

FIGS. 6(A)–(D) are diagrams showing the circuit arrangement of the active matrix circuit of this invention.

DETAILED DESCRIPTION OF THE INVENTION

Preferred embodiments according to this invention will be hereunder described with reference to the accompanying drawings.

[Embodiment 1]

Figure 3A:
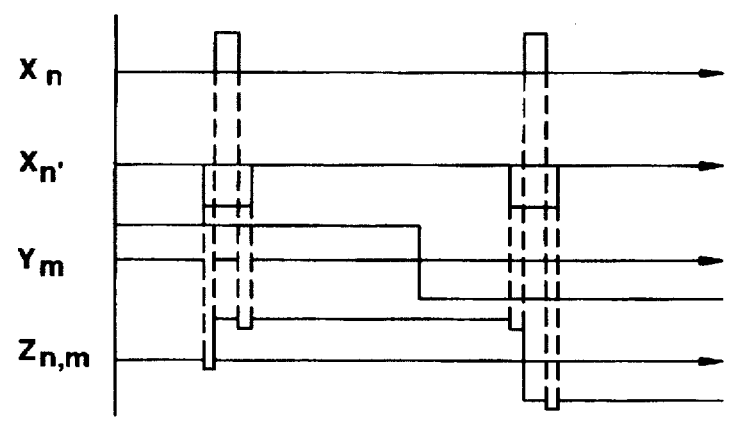
FIGS. 3(A)–(C) show a driving method for the active matrix circuits of the prior art and this invention.
Figure 3B:
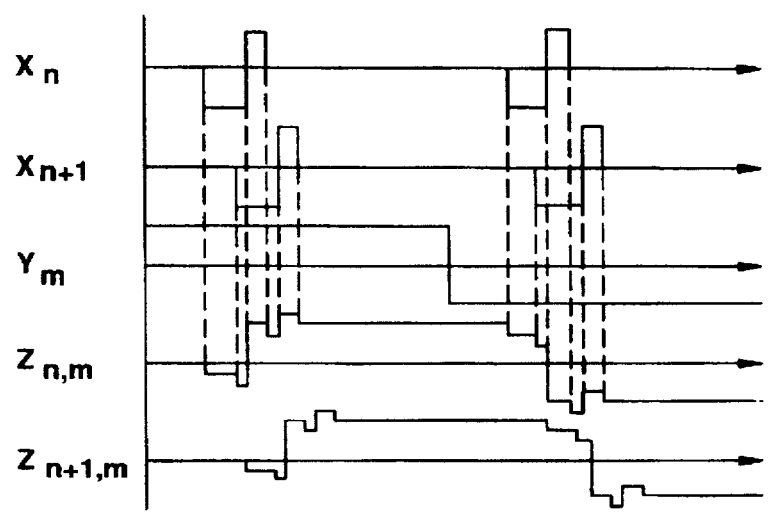
Figure 3C:
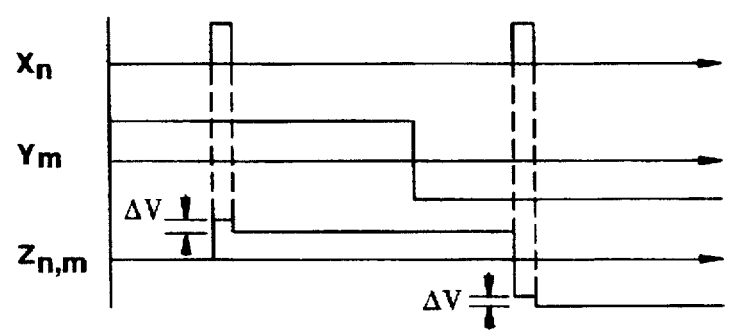
Figure 4:
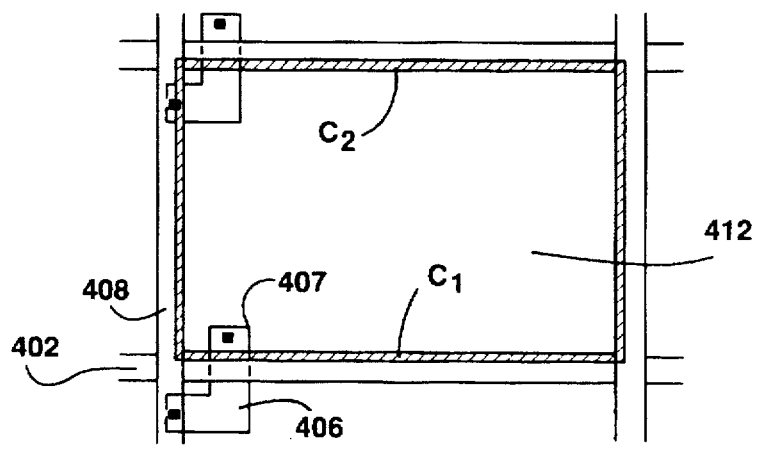
FIG. 4 shows an embodiment of the circuit arrangement of this invention.
Figure 5A:
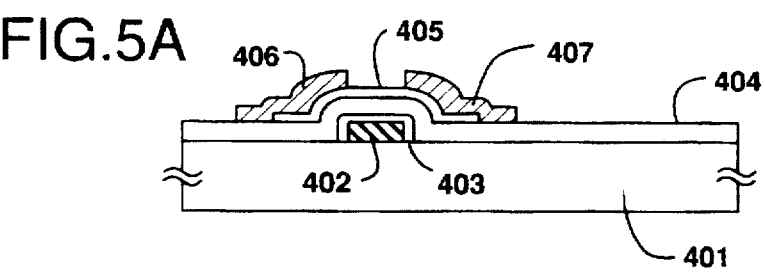
FIGS. 5(A)–(D) show an embodiment of a method of producing the circuit of this invention.
Figure 5B:
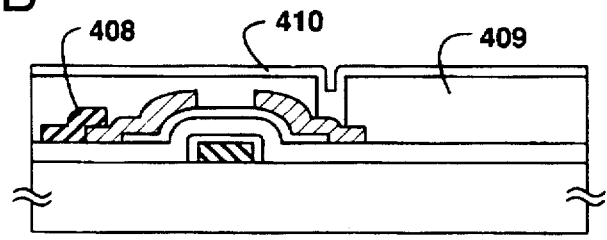
Figure 5C:
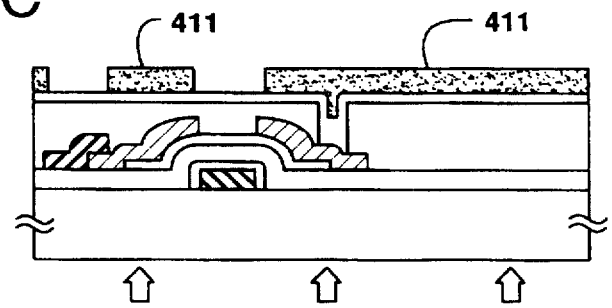
Figure 5D:
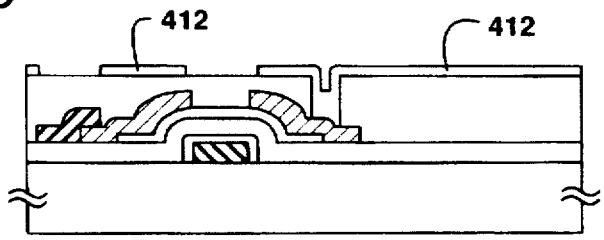
Figure 6A:
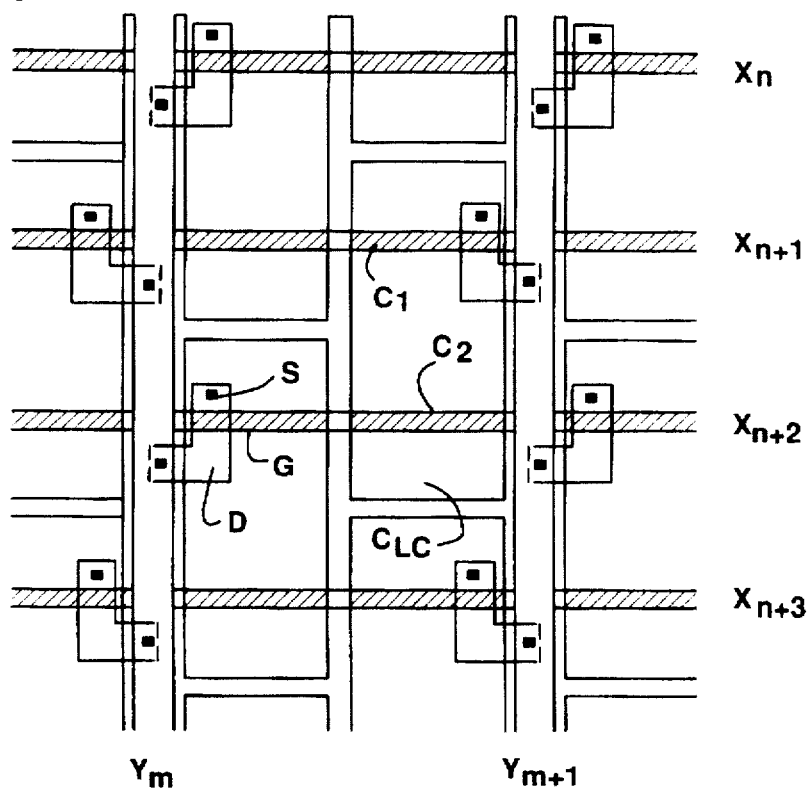

FIG. 6(A) is a top view of a circuit having an auxiliary capacity which is formed by the method of this embodiment. This circuit is identical to that of FIG. 1(B) in principle, and its operation is carried out in the manner as shown in FIG. 3(B).

Figure 1A:
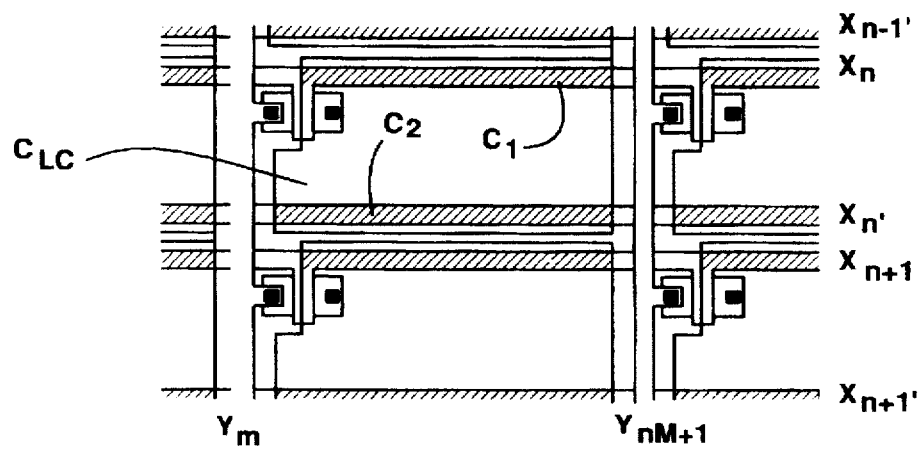
FIGS. 1(A)–(D) are diagrams showing an arrangement of an active matrix circuit and its circuit diagram.
Figure 1B:
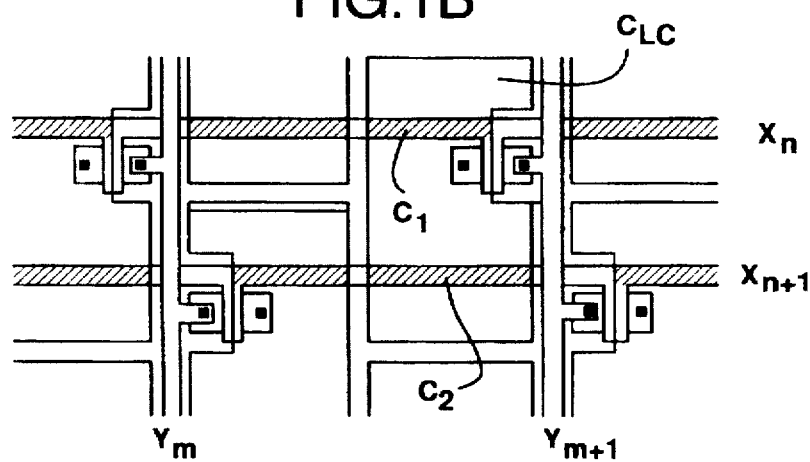
Figure 1C:
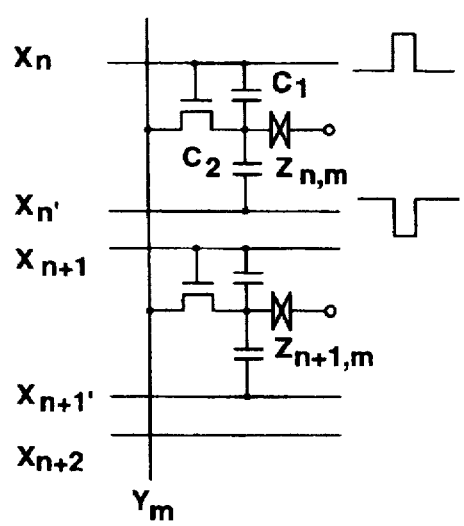
Figure 1D:
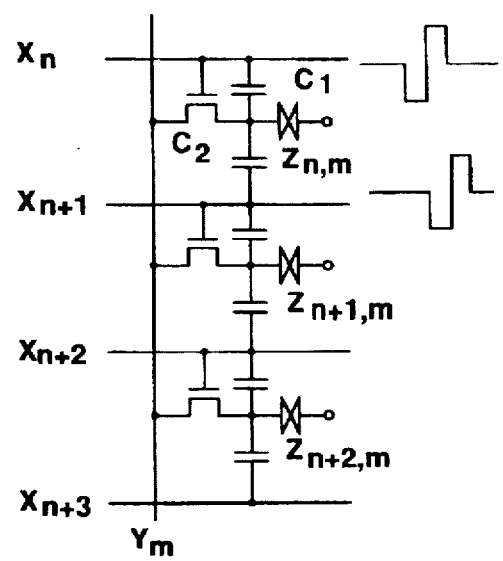
Figure 2A:
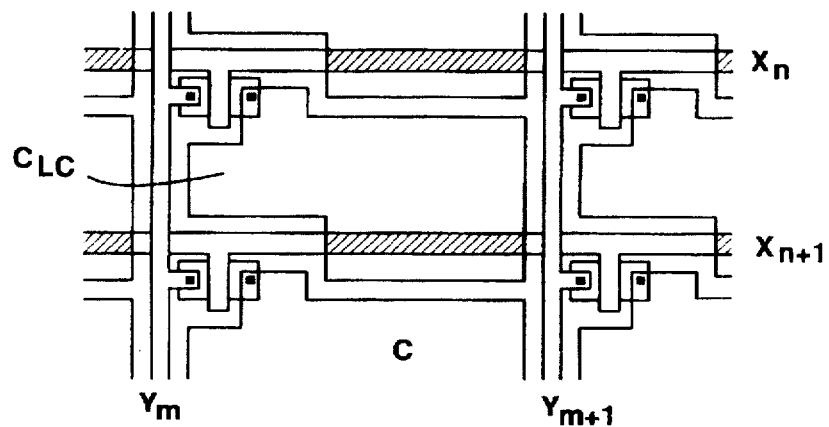
FIGS. 2(A)–(D) are diagrams showing an arrangement of a conventional active matrix circuit and its circuit diagram.
Figure 2B:
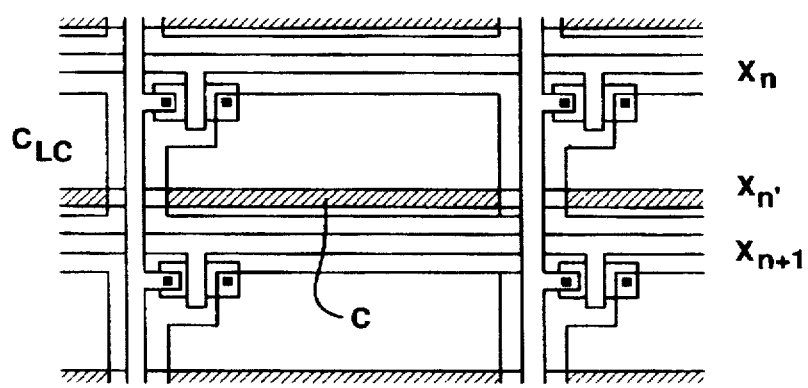
Figure 2C:
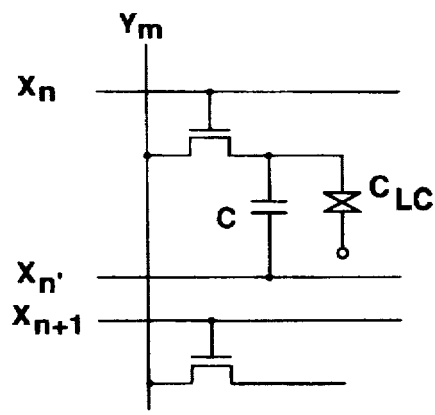
Figure 2D:
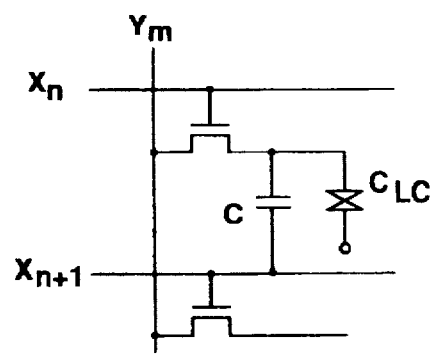

In FIG. 6(A), $X_n$ to $X_{n+3}$ represent gate lines, and $Y_m$ and $Y_{m+1}$ represent data lines. Two gate lines are necessarily transverse across each picture-element electrode $C_{LC}$. One of the transverse gate lines serves to drive the picture element and used as a gate electrode of a TFT while the other gate line does not serves so. The picture-element electrode is formed on the gate electrode (G), the source region (S) and the drain region (D) of the TFT, and is connected to the source region of the TFT through a contact hole. In this case, differing from the case as shown in FIG. 1(B), the gate electrode of the TFT does not extend into the picture element, and this is very favorable to equalize the capacitances $C_1$ and $C_2$.

The TFT and the picture element may be formed using the conventional technique. For example, when a planar type of TFT is intended to be formed in a self-alignment process, a method as disclosed in Japanese Patent Application No. 4-30220, No. 4-38637 or No. 3-273377 may be used.

In this embodiment, a structure of metal wiring (aluminum)/anode-oxide (aluminum oxide)/picture-element electrode (ITO) is used as the sectional structure of the auxiliary capacitances $C_1$ and $C_2$. In order to obtain this structure, the following process may be used. That is, the gate line is formed of aluminum, aluminum oxide is formed on the surface of the gate line by the anode-oxidation, and then the picture-element electrode is formed. In this case, aluminum oxide has dielectric constant of three times as high as that of silicon oxide, and thus it can contributes to increase of auxiliary capacitance. Further, when large auxiliary capacity is required, the gate line may be formed of tantalum or titan, and subjected to the anode-oxidation to use the oxide thus formed as dielectric body for auxiliary capacitance.

Alternately, in place of these producing method and the structure as described above, a conventionally well-used method of producing a structure of metal wiring/oxide (which can be formed by CVD method or sputtering method, such as silicon oxide, silicon nitride, etc.)/picture-element electrode may be used.

[Embodiment 2]

Figure 6B:
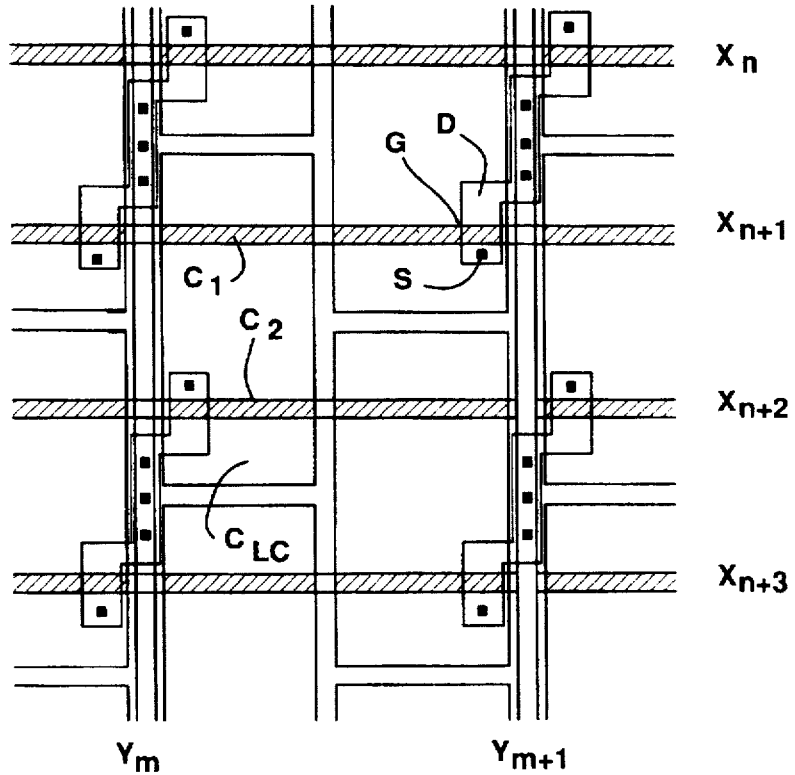

FIG. 6(B) is a top view of a circuit having auxiliary capacitance which is produced by this embodiment. This circuit is also identical to that of FIG. 1(B) in principle, and its operation is carried out by the method as shown in FIG. 3(B).

In FIG. 6(B). $X_n$ to $X_{n+3}$ represent gate lines, and $Y_m$ and $Y_{m+1}$ represent data lines. Two gate lines are necessarily transverse across each picture-element electrode $C_{LC}$. One of the transverse gate lines serves to drive the picture element and used as a gate electrode of a TFT while the other gate line does not serves so. The picture-element electrode is formed on the gate electrode (G), the source region (S) and the drain region (D) of the TFT, and is connected to the source region of the TFT through a contact hole. In this case, differing from the case as shown in FIG. 1(B), the gate electrode of the TFT does not extend into the picture element, and this is very favorable to equalize the capacitances $C_1$ and $C_2$.

In this circuit arrangement, the semiconductor regions of the two TFTs are jointed to each other. This circuit arrangement has the following advantage. That is, for example, when the data line and the semiconductor region (drain region) are contacted with each other, plural contact holes can be formed, and even when some of these plural contact holes are defective, the two TFTs are normally operated if at least one of the contact holes is normal. The same producing method and the same structure of the auxiliary capacitances $C_1$ and $C_2$ as those of the Embodiment 1 are used in this embodiment.

As described above, according to this invention, the affection of $\Delta V$ can be removed (offset) by the positive method as described above. This positive method has not existed in the prior art, and in this meaning this invention makes an epoch. In addition, an effective picture-element arrangement has been proposed to effectively obtain the effect of this invention. Such picture-element arrangement is also effective for a color display. The above embodiment relates to a planar type of TFT which is well used for a polysilicon TFT. However, the same effect can be obtained for a reverse stagger type of TFT which is well used for an amorphous silicon TFT.

Further, in the above description, the concrete operation method of the active matrix circuit was not described. In place of a conventional analog gradation system, a digital gradation system which has invented by the inventor of this application (for example, as disclosed in Japanese Patent Application No. 3-163873) may be adopted with no problem, whereby the gradation display can be performed using the active matrix circuit.

What is claimed is:

1. An active-matrix device comprising:

a substrate having an insulating surface;

at least first and second pixel electrodes arranged in a first column over said substrate;

at least a third pixel electrode arranged in a second column over said substrate, each of said first, second and third pixel electrodes being provided with at least one thin film transistor;

at least first, second and third gate lines extending in parallel over said substrate, wherein said first gate line drives the thin film transistor associated with said first pixel electrode;

said second gate line drives the thin film transistor associated with the third pixel electrode and extends below said first pixel electrode to form a storage capacitor between said second gate line and said first pixel electrode;

said third gate line drives the thin film transistor associated with the second pixel electrode and extends below said third pixel electrode to form a storage capacitor between said third gate line and said third pixel electrode.

2. An active matrix device according to claim 1 wherein each of said first, second and third pixel electrodes is light transparent.

3. An active matrix device according to claim 1 wherein each of said first, second and third gate lines extend in a uniform direction.

4. An active-matrix device comprising:

a substrate having an insulating surface;

at least first and second pixel electrodes arranged in a first column over said substrate;

at least a third pixel electrode arranged in a second column over said substrate, each of said first, second and third pixel electrodes being provided with at least one thin film transistor;

at least first, second and third gate lines extending in parallel over said substrate, wherein said first gate line drives the thin film transistor associated with said first pixel electrode;

said second gate line drives the thin film transistor associated with the third pixel electrode and extends below said first pixel electrode to form a storage capacitor between said second gate line and said first pixel electrode;

said third gate line drives the third film transistor associated with the second pixel electrode and extends below said third pixel electrode to form a storage capacitor between said third gate line and said third pixel electrode, and the storage capacitance between the third gate line and the third pixel electrode is substantially equal with a capacitance between said second gate line and said third pixel electrode.

5. An active matrix device according to claim 4 wherein each of said first, second and third pixel electrodes is light transparent.

6. An active matrix device according to claim 4 wherein each of said first, second and third gate lines extend in a uniform direction.

* * * * *